United States Patent [19]
Tallant et al.

[11] Patent Number: 6,075,131
[45] Date of Patent: Jun. 13, 2000

[54] MONOAZOCOMPOUNDS WITH AN INDANYL MOIETY

[75] Inventors: Neil Anthony Tallant; Paul Wight, both of Manchester; Peter Gregory, Bolton, all of United Kingdom

[73] Assignee: Zeneca Limited, United Kingdom

[21] Appl. No.: 09/319,951

[22] PCT Filed: Dec. 4, 1997

[86] PCT No.: PCT/GB97/03362

§ 371 Date: Oct. 13, 1999

§ 102(e) Date: Oct. 13, 1999

[87] PCT Pub. No.: WO98/27165

PCT Pub. Date: Jun. 25, 1998

[30] Foreign Application Priority Data

Dec. 14, 1996 [GB] United Kingdom .................. 9626026

[51] Int. Cl.[7] .......................... C09B 29/01; C09B 29/30; C09D 11/00
[52] U.S. Cl. ................... 534/659; 106/31.05; 106/31.06; 106/31.51; 427/466
[58] Field of Search ........................ 534/659; 106/31.05, 106/31.06, 31.51; 427/466

[56] References Cited

FOREIGN PATENT DOCUMENTS

| 229314 | 12/1972 | Germany . |
| 2264401 | 6/1973 | Germany . |
| 2448911 | 4/1976 | Germany . |

*Primary Examiner*—Fiona T. Powers
*Attorney, Agent, or Firm*—Rothwell, Figg, Ernst & Kurz, p.c.

[57] ABSTRACT

Compounds of Formula (1) have utility as dyes for ink-jet printing where Formula (1) comprises:

$$T_q\text{—}W \qquad \text{Formula (1)}$$

which includes all acceptable forms of such compounds selected from one or more of the following (including mixtures thereof and combinations thereof in the same species): stereoisomers, zwitterions, polymorphs, solvates, isotopic forms; and all suitable salts thereof; in which:

q represents from 1 to 4 inclusive;

W comprises an optionally substituted hydrocarbyl group (preferably an optionally substituted aromatic group, or an optionally substituted aliphatic group); and each T independently comprises a group of the Formula (2):

$$B\text{—}N\text{=}N\text{—}J\text{—}Y\text{—} \qquad \text{Formula (2)}$$

in which:

B comprises an optionally substituted indanyl group;
Y comprises a carbonyl group or a sulphonyl group; and
J comprises a group of Formula (3):

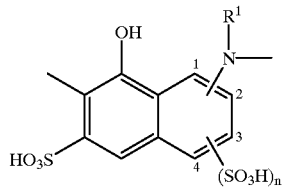

Formula (3)

in which:

$R^1$ comprises H or optionally substituted hydrocarbyl (preferably H or optionally substituted alkyl); and n represents from 0 to 3 inclusive; the compounds of Formula (1) being substantially free from fiber reactive groups.

18 Claims, No Drawings

MONOAZOCOMPOUNDS WITH AN INDANYL MOIETY

This invention relates to chemical compounds, especially coloured azo compounds, to inks containing the compounds especially inks suitable for colouring substrates such as sheet materials (e.g. paper); use of the compounds in a printing process such as ink jet printing ('IJP'); and substrates coloured with such compounds.

IJP is a non-impact printing technique in which droplets of ink are ejected through a fine nozzle onto a substrate without bringing the nozzle into contact with the substrate. There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to a first aspect of the present invention, there are provided compounds of Formula (1)

  Formula (1)

which includes all acceptable forms of such compounds selected from one or more of the following (including mixtures thereof and combinations thereof in the same species): stereoisomers, zwitterions, polymorphs, solvates, isotopic forms; and all suitable salts thereof; in which:

q represents from 1 to 4 inclusive;

W comprises an optionally substituted hydrocarbyl group (preferably an optionally substituted aromatic group, or an optionally substituted aliphatic group); and each T independently comprises a group of the Formula (2):

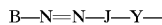  Formula (2)

in which:

B comprises an optionally substituted indanyl group;

Y comprises a carbonyl group or a sulphonyl group; and

J comprises a group of Formula (3):

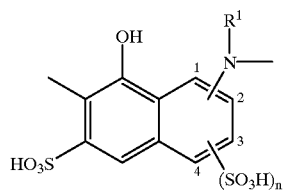  Formula (3)

in which:

$R^1$ comprises H or optionally substituted hydrocarbyl (preferably H or optionally substituted alkyl); and n represents from 0 to 3 inclusive; the compounds of Formula (1) being substantially free from fiber reactive groups.

The term 'hydrocarbyl' as used herein denotes any radical moiety which comprises one or more hydrogen atoms with one or more carbon atoms and optionally one or more other suitable heteroatoms, preferably nitrogen, oxygen and/or sulphur. More preferably 'hydrocarbyl' moieties comprise any of the following moieties and combinations thereof in the same moiety: alkyl, alkoxy, alkanoyl, carboxy, alkanoyloxy, alkoxycarbonyl, alkylthio, alkylsulphinyl, alkylsulphonyl, carbamoyl, sulphamoyl, alkylamino, and/or alkanoylamino. Hydrocarbyl moieties may also comprise one or more double and/or triple carbon to carbon bonds and/or aromatic moieties.

The term 'alkyl' or its equivalent (e.g. 'alk') as used herein may be readily replaced, where appropriate, by terms encompassing other hydrocarbon moieties such as those comprising double bonds, triple bonds, and/or aromatic moieties (e.g. alkenyl, alkynyl and/or aryl) as well as multivalent species attached to two or more substituents (such as alkylene). The term 'halo' as used herein signifies fluoro, chloro, bromo and iodo, preferably fluro and chloro.

Any radical group or moiety mentioned herein (e.g. as a substituent) refers to a monovalent radical unless otherwise stated or the context clearly indicates otherwise (e.g. an alkylene moiety is bivalent and links two other moieties). A group which comprises a chain of three or more atoms signifies a group in which the chain wholly or in part may be linear, branched and/or form a ring (including spiro and/or fused rings). The total number of certain atoms is specified for certain substituents for example $C_{1-n}$hydrocarbyl, signifies an hydrocarbyl moiety comprising from 1 to n carbon atoms. In any of the formulae herein if one or more ring substituents are not indicated as attached to any particular atom on the ring the substituent may replace any H attached to an atom in the ring and may be located at any available position on the ring which is chemically suitable.

Preferably any of the hydrocarbyl groups listed above comprise from 1 to 24 carbon atoms, more preferably from 1 to 18, most preferably from 1 to 10. It is particularly preferred that the number of carbon atoms in a hydrocarbyl group is from 1 to 4 inclusive.

The term 'optionally substituted' as used herein, unless immediately followed by a list of one or more substituent groups, means optionally substituted with one or more groups selected from: hydroxy, mercapto, amino, nitro, sulpho, sulpheno, sulphino, carboxy, halo and cyano.

Unless the context clearly indicates otherwise, as used herein plural forms of the terms herein are to be construed as including the singular form and vice versa.

The term 'acceptable' or 'suitable' [for example with reference to compounds of Formula (1)] will be understood to comprise those substances which if used in ink jet printing or any of the other uses specified herein provide the required properties to the composition and are compatible with the conventional carriers and/or diluents used to formulate inks.

Compounds of the present invention [Formula (1)] are free from fiber reactive groups. The term fiber reactive group is well known in the art and is described for example in EP 0356014 A1. Fiber reactive groups are capable, under suitable conditions, of reacting with the hydroxyl groups present in cellulosic fibres or with the amino groups present in natural fibres to form a covalent linkage between the fiber and the dye. As examples of fiber reactive groups excluded from the compounds of Formula (1) there may be mentioned aliphatic sulphonyl groups which contain a sulphate ester group in beta-position to the sulphur atom, e.g. beta-sulphato-ethylsulphonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulphonyl- or beta-chloroethylsulphonyl- or beta-sulphatoethyl-sulphonyl-endo-methylene cyclohexane carboxylic acids. Other examples of cellulose reactive groups are tetrafluorocyclobutyl carbonyl, trifluorocyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring.

It is to be understood that the compounds of the present invention include not only compounds in their free acid form shown in Formula (1), but also to the salts thereof and to mixtures of compounds of Formula (1).

Salts of Formula (1) may be formed from one or more organic and/or inorganic acids and/or bases (for example acid and/or base addition salts). Salts of Formula (1) comprise all acceptable salts that may be formed from monovalent and/or multivalent acids and/or bases (for example acid metal salts). Salts of Formula (I) also comprise all enantiomeric salts formed with acceptable chiral acids and/or bases and/or any mixtures of enantiomers of such salts (for example racemic mixtures). Salts of Formula (1) can include more than one counter-ion as appropriate for the stoichiometry of a particular salt of Formula (1). It is preferred, however, that the counter-ion comprises only one cation.

It is preferred that the compounds of Formula (1) are prepared as salts. Preferred salts are those with an alkali metal, particularly $Na^+$, $Li^+$ and $K^+$ or a substituted ammonium cation.

The substituted ammonium cation may be a quaternary ammonium group of the formula $^+NQ_4$ in which each Q independently is an organic radical, or two or three Qs together with the nitrogen atom to which they are attached form a heterocyclic ring and all remaining Qs are selected from $C_{1-4}$-alkyl or $C_{1-4}$-alkyl substituted by —OH. Preferred organic radicals represented by Q are $C_{1-4}$-alkyl radicals, especially methyl. Preferred heterocyclic rings formed by $^+NQ_4$ are 5 or 6 membered heterocyclic rings.

As examples of quaternary ammonium groups of formula $^+NQ_4$ there may be mentioned $N^+(CH_3)_4$, $N^+(CH_2CH_3)_4$, $N^+(C_2H_5)_3CH_3$, $N^+(C_3H_7)_3CH_3$, $N^+(C_2H_5)_2(C_2H_4OH)_2$, $N^+(C_2H_4OH)_3C_2H_5$, $N^+(CH_3)_3C_2H_4OH$, $N^+(C_2H_4OH)_3CH_3$, N-methyl pyridinium, N,N-dimethyl piperidinium and N,N-dimethyl morpholinium.

Alternatively the substituted ammonium cation may be a group of formula $^+NHQ^1_3$, wherein each $Q^1$ independently is H, $C_{1-4}$-alkyl, $C_{1-4}$-alkyl substituted by —OH or two or three groups represented by $Q^1$ together with the nitrogen atom to which they are attached form a 5 or 6 membered ring, especially a pyridine, piperidine or morpholine ring.

As examples of groups of formula $^+NHQ^1_3$ there may be mentioned $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $^+NH_4$, $(CH_3)_2CHN^+H_3$, $N^+H(C_2H_4OH)_3$, $N^+H_2(C_2H_4OH)(CH_3)$ $N^+H(C_2H_4OH)_2(C_2H_5)$, pyridinium, piperidinium and morpholinium.

Certain compounds of Formula (1) may exist as one or more stereoisomers, for example enantiomers, diastereoisomers, geometric isomers, tautomers, conformers and/or combinations thereof if possible within the same moiety and/or residue (such as any suitable molecular and/or ionic species). The present invention includes all acceptable stereoisomers of compounds of Formula (1) and/or any mixtures thereof.

Certain compounds of Formula (1) may exist as one or more zwitterions, for example where there exists two or more centres of ionic charge. The present invention includes all acceptable zwitterions of compounds of Formula (1) and/or any mixtures thereof.

Certain compounds of Formula (1) may exist as one or more polymorphs, for example different interstitial compounds, crystalline forms, amorphous forms, phases, solid solutions and/or any suitable mixtures thereof. The present invention includes all acceptable polymorphs of compounds of Formula (1) and/or any mixtures thereof.

Certain compounds of Formula (1) may exist in the form of one or more solvates formed from one or more acceptable solvents. The degree of salvation may be non-stoichiometric (for example if the solvent is water the hydrates may comprise hemihydrates, monohydrates and/or dehydrates). Compounds of Formula (1) may also exist in an unsolvated form (for example an anhydrous form). The present invention includes all acceptable solvated forms of compounds of Formula (1) and/or any mixtures thereof.

Certain compounds of Formula (1) may exist as one or more isotopic forms in which one or more of the commonly occurring isotopes of one or more atoms in compounds of Formula (1) are replaced by an isotope of the same atom (for example a $^{12}C$ atom may be replaced by a $^{14}C$ atom). Optionally the isotopes may be radio-active. Certain isotopic forms of compounds of Formula (1) may have utility as means for selective imaging in imaging devices (for example devices using X-rays, positron emission tomography and/or nuclear magnetic resonance); as tools to investigate the mode of action of compounds of Formula (1); and/or in any other uses suitable for isotopically labelled compounds of Formula (1). The present invention includes all acceptable, isotopic forms of compounds of Formula (1) and/or any mixtures thereof.

The present invention relates to compositions comprising any compounds of Formula (1) even those which may not be directly acceptable for some or all of the preferred uses described herein. For example compounds of Formula (1) which are unacceptable for use in ink jet printing may have other utility such as an intermediate in the preparation and/or purification of acceptable compounds of Formula (1) and/or as a research tool and/or diagnostic aid in relation to one or more of the uses described herein.

Suitable optionally substituted aromatic groups represented by W in the compounds of Formula (1) have a valency of q, where q is as defined previously, and include a group of the formula Ar, where Ar is an optionally substituted monocyclic or polycyclic aromatic group containing up to 10 carbon atoms, said group optionally containing one or more heteroatoms; two groups of the formula Ar joined together either through a direct link or through a divalent linking group; or an optionally substituted group of the formula alkylene-Ar.

Where Ar represents an aromatic group containing one or more heteroatoms, it preferably contains 1 to 3, more preferably 1 or 2, and especially 1 heteroatom(s). Preferred heteroatoms which are optionally present in groups represented by Ar are O, S and N.

Examples of groups of the formula Ar represented by W include derivatives of benzene, naphthalene, pyridine, quinoline, indole, thiophene, benzthiophene, furan and benzofuran, each of which is optionally substituted.

Where W represents two groups of the formula Ar linked together directly, any two of the aromatic groups Ar as previously defined, which may be the same or different, may be joined together, for example, derivatives of biphenyl and binaphthylene each of which is optionally substituted.

Where W represents two groups of the formula Ar joined through a divalent linking group, the groups of the formula Ar are each independently as previously defined and the divalent linking group is a divalent atom or chain of atoms. Suitable examples of two groups of the formula Ar joined through a divalent linking group represented by W, include groups with a valency of q, where q is as previously defined, which are derivatives of compounds of the formula:

Ar—X—Ar in which:
each Ar independently is an optionally substituted aromatic group as previously defined which may be the same or different; and
X is —O—, —S—, —SO$_2$—, —CO—, —NR$^1$— optionally substituted C$_{1-4}$-alkylene or optionally substituted C$_{2-4}$-alkenylene, where R$^1$ is independently as previously defined.

Preferred examples of two groups of the formula Ar joined through a divalent linking group include derivatives of diphenyloxide; diphenylamine; diphenylsulphide; diphenylsulphone; diphenylcarbonyl; diphenyl-(C$_{1-4}$-alkane) especially diphenylmethane and diphenylethane; and diphenyl-(C$_{2-4}$-alkene), especially stilbene; each of which is optionally substituted.

When W represents an optionally substituted group of the formula alkylene-Ar, it has a valency of q, where q is as previously defined and comprises a group as previously defined for Ar and one or more alkylene groups, each of which contains up to 10 carbon atoms. Preferred optionally substituted groups of the formula alkylene-Ar are derivatives of compounds of the Formula (4) which have a valency of q:

Ar—[Z]$_t$—  Formula (4)

in which
Ar is as previously defined;
each Z independently is an optionally substituted C$_{1-6}$-alkylene group which is attached to Ar; and
t represents from 1 to 4 inclusive.

Where W is a derivative of a group of the Formula (4), each Z in Formula (4) is attached to a group T, where T is as previously defined, the remaining groups of the formula T [i.e. (q-t) groups, where q and t are as previously defined] are attached to Ar in Formula (4).

Examples of groups of the formula alkylene-Ar represented by W comprise: C$_6$H$_5$CH$_2$—, C$_6$H$_5$CH$_2$CH$_2$—, C$_6$H$_5$CH$_2$CH$_2$CH$_2$—, —C$_6$H$_4$CH$_2$—, —CH$_2$CH$_2$C$_6$H$_4$CH$_2$CH$_2$—, C$_6$H$_3$—(CH$_2$CH$_2$)$_3$— and —C$_6$H$_3$—(CH$_2$)$_2$—, each of which may be optionally substituted.

Where W is an aliphatic group it has valency of q, where q is as previously defined and contains up to 12 carbon atoms, the group may be straight chained, branched chained or cyclic. Preferred aliphatic groups represented by W include derivatives of alkanes, more preferably C$_{1-10}$-alkanes and especially C$_{1-8}$-alkanes; alkenes, more preferably C$_{2-10}$-alkenes and especially C$_{2-6}$-alkenes; cycloalkanes more preferably C$_{5-10}$-cycloalkanes; derivatives of alkanes or alkenes which contain one or more hetero atoms selected from O, S and N; or aliphatic 5 or 6 membered heterocyclic groups, more preferably piperidine, morpholine, pyrrolidine and piperazine; each of the said aliphatic groups being optionally substituted.

Preferred suitable aliphatic groups represented by W may comprise:

optionally substituted C$_{1-10}$-alkyl (more preferably methyl, ethyl, propyl and hexyl); optionally substituted C$_{5-10}$cycloalkyl groups, (more preferably optionally substituted cyclohexyl);

optionally substituted C$_{1-10}$alkylene (more preferably C$_{2-8}$alkylene; most preferably ethylene, propylene and butylene);

optionally substituted C$_{2-10}$alkenylene (more preferably vinylene and propenylene); groups of the formula —(C$_{1-6}$alkylene)-X—(C$_{1-6}$alkylene)- where X is as previously defined (more preferably X comprises —NR$^1$—, —O— or —S—);

groups of the formula N(R$^2$)$_3$ where each R$^2$ independently comprises H or optionally substituted C$_{1-6}$alkylene (more preferably N(CH$_2$)$_3$); or 3 or 4 valent alkane derivatives of the formula:

in which:
A comprises optionally substituted C$_{1-12}$alkylene (more preferably C$_{2-10}$alkylene);
E comprises optionally substituted C$_{1-6}$-alkylene; and d represents 1 or 2; provided that the group contains 12 carbon atoms or less; for example

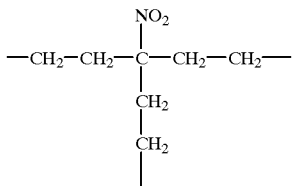

and

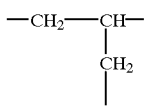

Optional substituents which may be present on the groups represented by W include C$_{1-10}$alkyl, preferably C$_{1-6}$alkyl and especially methyl, ethyl and propyl; C$_{2-10}$alkenyl, preferably C$_{2-6}$alkenyl; C$_{5-8}$cycloalkyl, preferably cyclohexyl; C$_{1-6}$alkoxy, preferably C$_{1-4}$alkoxy and especially methoxy; a 5 or 6 membered heterocyclic group and aryl, preferably phenyl, each of the aforementioned optional substituents themselves being optionally substituted by OH, COOH, SO$_3$H, NH$_2$, NO$_2$, halo, preferably F or Cl, phenyl or phenyl substituted by OH, COOH, NH$_2$ or SO$_3$H.

Other optional substituents which may be present on groups represented by W include for example halo, preferably F or Cl, NO$_2$, CF$_3$, CN, SO$_3$H, and groups of the formulae OR$^3$ SR$^3$, COR$^3$, COOR$^3$, NR$^3$R$^4$, SO$_2$NR$^3$R$^4$, NR$^3$COR$^4$, CONR$^3$R$^4$ and OCOR$^3$, where R$^3$ and R$^4$ each independently represent H, optionally substituted alkyl, optionally substituted cycloalkyl, optionally substituted alkenyl, optionally substituted aryl, optionally substituted aralkyl, a heterocyclic group, or R$^3$ and R$^4$ together with the nitrogen to which they are attached form a 5 or 6 membered ring.

When either $R^3$ or $R^4$ represent an optionally substituted alkyl group, suitable groups include for example, straight or branched chain optionally substituted $C_{1-10}$alkyl groups, preferably optionally substituted $C_{1-6}$alkyl groups and especially optionally substituted $C_{1-4}$alkyl groups.

Suitable optionally substituted cycloalkyl groups which may be represented by $R^3$ and $R^4$ include for example, optionally substituted $C_{5-12}$cycloalkyl, preferably optionally substituted $C_{5-8}$cycloalkyl and especially optionally substituted cyclohexyl.

Where $R^3$ or $R^4$ represent an optionally substituted alkenyl group, suitable groups include for example, optionally substituted $C_{2-6}$alkenyl, preferably optionally substituted $C_{2-4}$alkenyl groups.

Suitable optionally substituted aryl groups which may be represented by $R^3$ or $R^4$ include for example mono and bicyclic aryl groups such as phenyl and naphthyl preferably phenyl, each of which is optionally substituted.

Where $R^3$ or $R^4$ represent optionally substituted aralkyl groups, suitable groups include for example, optionally substituted aryl($C_{1-4}$alkyl), preferably optionally substituted phenyl($C_{1-4}$-alkyl), and more preferably benzyl and phenylethyl.

Suitable heterocyclic groups which may be represented by $R^3$ and $R^4$ are preferably 5 or 6 membered rings and include for example thienyl; pyrrolyl; pyridyl; pyrimidyl; tetrahydrofuryl; pyrrolidinyl; piperidyl; piperazinyl and morpholinyl.

Where $R^3$ and $R^4$ together with the nitrogen atom to which they are attached form a 5 or 6 membered ring it is preferably piperidino, morpholino or piperazinyl.

Optional substituents which may be present on $R^1$, $R^2$, $R^3$, $R^4$ and B are preferably selected from H; $C_{1-6}$-alkyl, more preferably $C_{1-4}$alkyl and especially methyl; $C_{1-6}$alkoxy, especially methoxy and ethoxy; aryl, especially phenyl; aryl$C_{1-4}$alkyl, more preferably phenyl($C_{1-4}$-alkyl) and especially benzyl; amido, especially $C_{1-4}$alkylamido; halo especially F, Cl and Br; hydroxy; nitro; CN; $SO_3H$; COOH; or a 5 or 6 membered heterocyclic group such as tetrahydrofuryl, piperazinyl or morpholino.

It is preferred that $R^1$ is H or optionally substituted $C_{1-4}$alkyl, more preferably H, $C_{1-4}$alkyl or $C_{1-4}$alkyl substituted by OH.

Where W represents an aromatic group of the formula Ar in the compounds of Formula (1), it is preferred that W is an optionally substituted benzene group. Accordingly preferred compounds of the present invention are compounds of Formula (5) and/or suitable salts and other forms thereof, where Formula (5) represents:

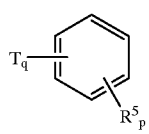

Formula (5)

in which
q and each T are as previously defined;
p comprises 0, 1, 2 or 3 provided that (p+q)≦6; and
each $R^5$ independently represents one of the previously defined optional substituents which may be present on W.

When q is 1 in Formula (5) it is preferred that p is 0, 1 or 2, more preferably 0 or 1; and each $R^5$ is independently halo (preferably Cl); COOH; $SO_3H$; OH; $C_{1-6}$alkyl optionally substituted by OH or COOH; $C_{1-4}$alkoxy optionally substituted by OH or halo. More preferably each $R^5$ is independently $C_{1-6}$-alkyl or COOH; most preferably $C_{1-4}$alkyl or COOH.

When q is 2 in Formula (5) it is preferred that $R^5$ is COOH, OH, $C_{1-4}$-alkyl or $C_{1-4}$alkoxy and p is 0 or 1, preferably 0. Accordingly, preferred compounds when q is 2 in the Formula (5) are compounds of Formulae (5a) and (5b).

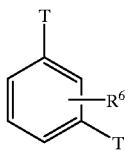

Formula (5a)

and

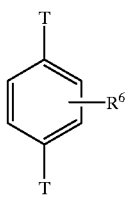

Formula (5b)

in which:
each T independently is as previously defined; and
$R^6$ is H, —COOH, OH, $C_{1-4}$-alkyl or $C_{1-4}$-alkoxy.
It is preferred that $R^6$ is H.

Where q is 3 in Formula (5), it is preferred that p is 0 and that the groups represented by T are at the 1-, 3- and 5-positions on the phenyl group. Accordingly, preferred compounds of the Formula (5) where q is 3 are compounds of Formula (5c):

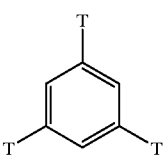

Formula (5c)

in which
each T is independently as previously defined.

Where W represents an aliphatic group, it is preferred that W is a mono or bivalent group such that q is 1 or 2 in Formula (1). Accordingly a preferred embodiment of the present invention, when W is an aliphatic group, are compounds of Formulae (1a) and (1b):

   Formula (1a)

and

   Formula (1b)

in which:
each T independently is as previously defined; and
W is a hydrocarbyl group (preferably aliphatic group) as previously defined.

Preferred mono and bivalent aliphatic groups represented by W are mono and bivalent derivatives of optionally substituted $C_{1-10}$alkanes more preferably optionally substituted $C_{1-8}$alkanes and especially optionally substituted $C_{2-8}$alkanes; optionally substituted $C_{2-10}$alkenes more preferably optionally substituted $C_{2-5}$alkenes; optionally substituted groups of the formulae $(C_{1-6}alkyl)X(C_{1-6}alkylene)$, or $(C_{1-6}alkylene)X(C_{1-6}alkylene)$, where X is as previously defined, preferably O, S or $NR^1$; or an optionally substituted group of the formula $(C_{1-10}alkylene)Z^1$, where $Z^1$ is a group of formula $OR^3$, $SR^3$, $COR^3$, $COOR^3$, $NR^3R^4$, $SO_2NR^3R^4$ or $OCOR^3$, where $R^3$ and $R^4$ are as previously defined.

Where the previously defined preferred mono and bivalent aliphatic groups represented by W are substituted, preferred substituents are selected from OH, halo, especially F and Cl, COOH and/or $NR^3R^4$ where $R^3$ and $R^4$ are as previously defined.

Where the indanyl group(s) represented by B is/are substituted, it is preferred that at least one of the substituents comprises a sulpho group. More preferably, any substituents present in B are sulpho groups. It is preferred that B is an optionally substituted 5-indanyl group.

Accordingly, in preferred embodiments of the present invention, the group(s) represented by B independently is/are of the Formula (6):

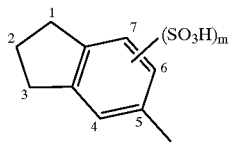

Formula (6)

in which m comprises from 0 to 3 inclusive.

It is preferred that m is 0 or 1. When m is 1 it is preferred that the sulpho group is attached at the 6-position in the indanyl group.

In the group of Formula (3), it is preferred that n is 1 and that the sulpho group is attached at the 3-position on the naphthalene nucleus.

Preferably in Formula (3) above, the group of the formula

(in which $R^1$ is as previously defined) is attached at the 1 position in the group of Formula (3).

It is preferred that the nitrogen atom in the group of Formula (3) is attached to the group Y in Formula (2).

An especially preferred group which may be represented by J in Formula (2) comprises a group of Formula (7):

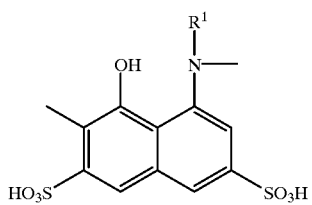

Formula (7)

in which $R^1$ is as previously defined.

According to a further feature of the present invention there is provided a process for the manufacture of compounds of Formula (1) comprising coupling a compound of the formula (8):

[H—J—Y]$_q$—W    Formula (8)

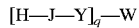

in which J, W, Y and q are as previously defined; with an optionally substituted aminoindan compound of the formula $BNH_2$ which has been diazotised, where B is as previously defined.

Diazotisation of the optionally substituted aminoindan may be carried out using any suitable diazotisation agent. Conveniently the diazotisation agent is formed in-situ, for example by dissolving an alkali metal nitrite, preferably sodium nitrite, in a molar excess of mineral acid, preferably HCl. Normally at least 1 mole of diazotisation agent per mole of the optionally substituted amino indan will be used, preferably from 1 to 1.25 moles. The temperature of the diazotisation is not critical and may conveniently be carried out at from −5° C. to 20° C., preferably from 0 to 10° C. and especially from 0 to 5° C.

The coupling is preferably performed in a liquid medium, more preferably an aqueous medium and especially water.

The coupling is preferably performed in the temperature range of from −10 to 40° C., preferably from 0 to 25° C.

After the coupling the product may be isolated by acidifying the reaction mixture, preferably using a mineral acid, especially hydrochloric acid. Alternatively, the product may be isolated as a salt by the addition of an alkali metal halide to the reaction mixture. Examples of suitable alkali metal halides include, sodium halides and potassium halides, especially sodium chloride. Where the product precipitates as a solid it may be separated from the mixture by filtration.

If desired unwanted anions may be removed from the product of the above process by dialysis, osmosis, ultrafiltration or a combination thereof.

The product of the above process may be converted, where necessary, to the alkali metals, $NH_4^+$, quaternary ammonium or organic amine salt by the addition of ammonia, ammonium hydroxide, primary, secondary, tertiary or quaternary amine, or a suitable alkali metal salt such as NaCl, to a solution of the product.

The compounds of the formula (8) may be prepared by condensing a compound of the Formula (9):

[L—Y]$_q$—W    Formula (9)

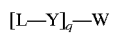

with a compound of the Formula (10):

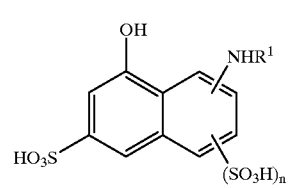

Formula (10)

in which:

L is a labile atom or group; and $R^1$ W, Y, n and q are as previously defined. Preferably L represents halo, more preferably Cl and/or Br, $OSO_3H$, $CH_3COO$ and OH.

Where q is 1, 2 or 3 and Y is a carbonyl group in Formula (8), the compounds of Formula (8) may alternatively be prepared by reaction of a cyclic acid anhydride of the Formula (11):

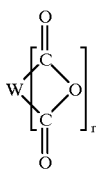

Formula (11)

where represents 1, 2 or 3; and W is as previously defined; with a compound of the formula H—J—H as previously defined; to give a carboxy-substituted compound of the formula

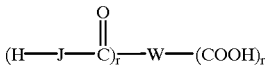

where each of J, r and W are as previously defined.

It is preferred that r is 1.

It is preferred that the condensation of the compound of Formula (9) with the compound of Formula (10) is carried out in the presence of a base and a suitable buffer. The base may be any inorganic base such as an alkali metal or alkali earth metal hydroxide, carbonate or bicarbonate for example sodium hydroxide and sodium carbonate. Preferred organic bases include tertiary amines such as N-alkylated heterocycles, for example N-($C_{1-4}$-alkyl)morpholine, N,N'-di($C_{1-4}$alkyl) piperazine, tri($C_{1-4}$alkyl)amines, for example triethylamine and optionally substituted pyridines, especially pyridine. Any convenient buffer may be used, for example sodium acetate.

The condensation is preferably carried out in a liquid medium, more preferably an aqueous medium and especially water. Additional liquids may also be used to aid the solution or dispersion of the compound of Formula (9). For example, ketones such as acetone and aqueous carboxylic acid solutions such as acetic acid solution.

Examples of suitable compounds of the Formula (9) include aromatic carbonyl halides; aliphatic carbonyl halides; aromatic sulphonyl halides, preferably aromatic sulphonyl chlorides; and aliphatic sulphonyl halides, preferably aliphatic sulphonyl chlorides, each of which may be optionally substituted by one or more of the substituents hereinbefore defined as being suitable as optional substituents on W in Formula (1).

Examples of suitable aromatic carbonyl halides which may be represented by Formula (9) comprise:

benzoyl halides, preferably benzoyl chloride, 3,5-dihydroxybenzoylchloride, 3,4,5-trihydroxybenzoylchloride, and 4-(chlorocarbonyl) benzoic acid; halobenzoyl chlorides, preferably o, m or p-chlorobenzoyl chloride; alkyl benzoyl halides, preferably $C_{1-10}$-alkyl benzoyl chlorides, more preferably $C_{1-10}$-alkylbenzoyl chlorides and especially toluoyl chloride; alkoxy benzoyl halides, preferably $C_{1-10}$-alkoxybenzoyl chlorides, more preferably $C_{1-4}$alkoxy benzoyl chlorides and especially anisoyl chloride and 4-hydroxy-3-methoxybenzoyl chloride; salicyloyl halides, preferably salicyloyl chloride; phthaloyl, isophthaloyl and terephthaloyl dihalides, preferably phthaloyl dichloride, isophthaloyl dichloride and terephthaloyl dichloride; naphthoyl halides substituted with a group as previously defined for $R^5$, preferably naphthoyl chloride; nicotinoyl halides, preferably nicotinoyl chloride; thiophene carbonyl halides, preferably 2-thiophene carbonyl chloride and benzothiophenecarbonyl chloride; furoyl halides, preferably 2-furoyl chloride; and diphenylcarbonyl halides preferably diphenylmethane-4,4'-dicarbonylchloride, diphenyl-4,4'-dicarbonylchloride, diphenylcarbonyl-4',4-dicarbonylchloride, stilbene-4,4'-dicarbonylchloride and diphenylmethane-4-carbonylchloride.

Examples of aliphatic carbonyl halides represented by Formula (9) comprise: alkyl carbonyl halides and alkylene carbonyl halides, preferably $C_{1-10}$-alkylcarbonyl halides and $C_{1-10}$-alkylene dicarbonyl halides and especially $C_{1-4}$-alkyl carbonyl halides and $C_{1-4}$-alkylene dicarbonyl halides, (for example acetyl chloride, propionyl chloride, butyryl chloride, isobutyryl chloride, valeryl chloride, isovaleryl chloride, pivaloyl chloride, oxalyl dichloride, malonyl dichloride, succinyl chloride, adipolyl chloride, and pimeloyl chloride); halo, preferably chloro substituted $C_{1-10}$-alkyl carbonyl halides, for example chloroacetylchloride, 2- & 3-chloropropionylchloride, chlorobutyrylchlorides and chloroalerylchlorides, $C_{2-10}$-alkenylene halides, for example fumaryl dichloride; cyclohexyl carbonyl halides such as cyclohexyl carbonyl chloride; tricarbonylhalide alkanes such as 1,3,5-pentanetricarbonyl trichloride; alkylcarbonyl halide; and substituted amines such as $N(CH_2COCl)_3$.

Examples of aliphatic and aromatic sulphonyl halides represented by Formula (9) comprise benzene sulphonyl halides especially benzene sulphonyl chloride; and 4-(chlorosulphonyl)benzoic acid; alkyl benzenesulphonyl halides, preferably $C_{1-4}$-alkylbenzene halides, and especially tosylchloride; alkoxybenzenesulphonyl halides, preferably $C_{1-4}$-alkoxybenzenesulphonyl chloride, and especially methoxybenzenesulphonyl chloride; phenyl di-sulphonylhalides for example 1,4-(chlorosulphonyl) benzene; diphenylmethane-4,4'-disulphonylchloride; diphenyl-4,4'-disulphonyl chloride; and alkyl and alkylene sulphonyl halides, preferably $C_{1-10}$-alkyl and $C_{1-10}$-alkylene sulphonyl halides, (for example methane sulphonyl chloride, ethane sulphonyl chloride, propane sulphonylchloride, 2-chloro-1-ethanesulphonyl chloride, 3-chloropropanesulphonyl chloride, 1,2-(chlorosulphonyl) ethane and 1,3-(chlorosulphonyl)propane).

Suitable examples of compounds of the Formula (11) include phthalic anhydride succinic anhydride and 1,2-cyclohexanedicarboxylic anhydride.

It is preferred that the compound of Formula (10) is 8-amino-1-naphthol-3,6-disulphonic acid.

Where W is substituted with a group of the formula $NR^3R^4$, where $R^3$ and $R^4$ are as previously defined, it is preferred that the compounds of Formula (8) are prepared by condensing a compound for Formula (12):

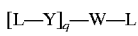  Formula (12)

with a compound of formula:

where q, L, Y, W and J are as previously defined, to give a compound of Formula (13):

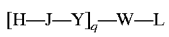  Formula (13)

followed by a further condensation with ammonia or an amine of the formula $NHR^3R^4$ to give a compound of Formula (9) substituted by $NR^3R^4$:

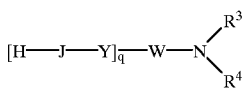

Examples of compounds of the Formula (12) include chloroacetyl chloride, 3-chloropropionylchloride, chlorobutyrylchlorides, 2-chloro-1-ethane-sulphonyl-chloride and 3-chloropropanesulphonyl chloride. It is preferred that the compound of the formula $NHR^3R^4$ is ammonia, or an N-alkyl or N,N-dialkyl amine.

The reactions leading to the formation of the compounds of the invention may also be performed using conditions that have been fully described in the art for such reactions. Similarly, the compounds may be isolated by known methods, for example spray drying or precipitation and filtration.

According to a further feature of the present invention there is provided a colorant for an ink, characterised in that the colorant is a compound of Formula (1). The compounds of Formula (1) exhibit high solubility in water and aqueous media, have good light fastness and give a print with a strong magenta shade on plain paper.

The compounds of Formula (1) are versatile, exhibiting high water fastness and rapid fixation on alkaline, neutral and acid papers and good solubility in aqueous ink media.

According to a further aspect of the present invention there is provided an ink comprising:
(a) from 0.01 to 30 parts of a dye of the Formula (1); and
(b) from 70 to 99.99 parts of a liquid medium or a low melting point solid medium;
wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the dye precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$alkyl and $C_{1-4}$alkyl ethers of diols, more preferably mono-$C_{1-4}$alkyl ethers of diols having 2 to 12 carbon atoms, especially 2-methoxy-2-ethoxy-2-ethoxyethanol.

A preferred liquid medium comprises:
(a) from 75 to 98 parts water; and
(b) from 25 to 2 parts in total of one or more solvents selected from diethylene glycol, 2-pyrrolidone, thiodiglycol, N-methylpyrrolidone, cyclohexanol, caprolactone, caprolactam and pentane-1,5-diol;
wherein the parts are by weight and the sum of the parts (a) and (b)=100.

Another preferred liquid medium comprises:
(a) from 60 to 90 parts water;
(b) from 2 to 20 parts diethylene glycol; and
(c) from 0.5 to 20 parts in total of one or more solvents selected from 2-pyrrolidone, N-methylpyrrolidone, cyclohexanol, caprolactone, caprolactam, pentane-1,5-diol and thiodiglycol;
wherein the parts are by weight and the sum of the parts (a), (b) and (c)=100.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$alcohols. In view of the foregoing preferences it is especially preferred that where the liquid medium is an organic solvent free from water it comprises a ketone (especially methyl ethyl ketone) &/or an alcohol (especially a $C_{1-4}$alkanol, more especially ethanol or propanol).

The organic solvent free from water may be a single organic solvent or a mixture of two or more organic solvents.

It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The dye of Formula (1) may be dissolved in the low melting point solid or may be finely dispersed in it.

The ink may also contain additional components conventionally used in ink jet printing inks, for example viscosity and surface tension modifiers, corrosion inhibitors, biocides, kogation reducing additives and surfactants which may be ionic or non-ionic.

It is preferred that the inks further comprise one or more surfactants to aid the penetration of the dye into a paper substrate. Suitable surfactants include anionic surfactants for example, fatty acid salts and alkylbenzenesulphonates; cationic surfactants for example, aliphatic amine salts and quarternary ammonium salts; and non ionic surfactants for example, ethylene oxide adducts of higher alcohols, of alkylphenols, of higher alcohol fatty acid esters, of fatty acid amides, of polypropylene glycol and of acetylene, fatty acid esters of polyhydric alcohols and amino acid and betaine type amphoteric surfactants. It is preferred that the surfactant is a non ionic surfactant, more preferably poly(ethylene oxide) adducts of acetylene, for example SURFYNOL 465™ (available from Air Products Ltd). Where a surfactant is used in an ink it is preferably present at a concentration in the range of from 0.01 to 10%, more preferably from 0.1 to 5% and especially from 0.1 to 3% based upon the total weight of the ink.

A still further aspect of the invention provides a process for printing an image on a substrate comprising applying an ink containing a dye of Formula (1) to the substrate by means of an ink jet printer.

The ink used in this process is preferably as defined in the further aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, textile, metal, glass, or ceramic; more preferably paper, an overhead projector slide or a textile material, especially paper.

Preferred papers are plain or treated papers which may have an acid, alkaline or neutral character. A further aspect of the present invention provides a paper, an overhead projector slide or a textile material printed with an ink, a dye or by means of a process as hereinbefore defined.

When the substrate is a textile material the ink according to the invention is preferably applied thereto by:

i) applying the ink to the textile material using an ink jet printer; and ii) heating the printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in European Patent Application No. 534660A1.

According to a yet further aspect of the present invention, there is provided a paper, an overhead projector slide, a textile material, especially a cellulosic textile material, a metal, glass or ceramic printed with an ink composition which contains a compound of Formula (1).

The invention is further illustrated but not limited by the following Examples, in which all parts and percentages are by weight unless stated otherwise.

Synthesis A: Preparation of 5-Aminoindan-6-sulphonic acid

5-Aminoindan (48.5 g) was finely ground and added with vigorous stirring to concentrated sulphuric acid (200 ml). The mixture was heated at 95° C. for 20 hours then cooled to ambient temperature and drowned out into ice (800 g). The title product was filtered off, washed with acetone and dried under vacuum at ambient temperature.

Synthesis B: Preparation of 8-Benzamido-1-naphthol-3,6-disulphonic acid

8-Amino-1-naphthol-3,6-disulphonic acid (80 g) was dissolved in water (500ml) at pH7. A 20% v/v aqueous solution of acetic acid (6 ml) was added followed by sodium acetate (35 g) and the solution was stirred for 10 minutes. Benzoyl chloride (38.5 g) was added over 15 minutes, with an extra 200 ml water being added near the end of the addition to aid stirring. After stirring for 1 hour, 10N sodium hydroxide solution was added (37ml) followed by sodium carbonate (10 g) and the mixture heated at 90–95° C. for 1 hour. The sodium salt of the title product was then precipitated by salting to 20% w/v using sodium chloride. After cooling to room temperature, the precipitate was filtered off and washed with 20% brine. The filtrates were salted to a further 7.5% to give a second crop of the product. The two crops were re-dissolved in water (350 ml) and precipitated by the addition of 10N hydrochloric acid. The precipitate was crystallised from water to give the title product as a finely divided creamy solid which was isolated by filtration and dried under vacuum at ambient temperature.

EXAMPLE 1

Preparation of:

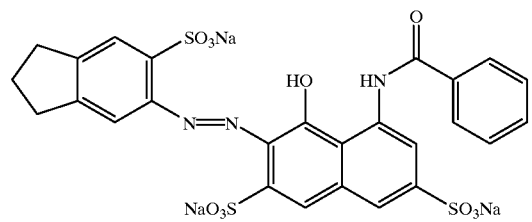

Stage 1: Diazotisation

To a solution of 5-aminoindan-6-sulphonic acid (4.27 g) in water (100 ml) at pH6 was added 2N sodium nitrite solution (11 ml). The reactant mixture was then added to a mixture of ice and concentrated hydrochloric acid (5 ml) and was diazotised at 0–5° C. for 1.5 hours. Excess nitrous acid was then destroyed with 10% aqueous sulphamic acid.

Stage 2: Coupling

8-Benzamido-1-naphthol-3,6-disulphonic acid (8.47 g) (from Synthesis A) was suspended in water (100 ml) and added to the solution of the diazonium ion from Stage 1. The reactant mixture was coupled at pH6 for 1 hour whilst maintaining the temperature in the range 0–5° C. The coupling reaction produced a gel which was diluted with water (500 ml). The reactant mixture was stirred for 30 minutes and was then left to warm to ambient temperature. The product of the reaction was precipitated from solution by the addition of sodium chloride to give 15% (w/v) sodium chloride in the reactant mixture. The title product was isolated by filtration, dialysed and then dried at 60° C.

Ink Jet Printing

To an ink base comprising 88 parts water, 5 parts 2-pyrrolidone, 5 parts thiodiglycol and 2 parts SURFYNOL 465™ (available from Air Products Ltd) was added the title dye to give a 4% solution of the title dye in the ink base. The solution was then adjusted to pH10 using concentrated aqueous $NH_3$ solution and filtered through a 0.45 μm membrane.

When applied to plain paper using an ink jet printer, the dye gave very strong, bright magenta prints with excellent light fastness. After 48 hours exposure, using an Atlas™ Xenon Weatherometer Ci35A, the print had $\Delta E=9.6$.

EXAMPLE 2

Preparation of the sodium salt of:

$NaCO_3$ and stirred at 0–5° C. for 1 hour followed by stirring at ambient temperature for 12 hours. The solution was salted to 10% w/v using sodium chloride and the title product was filtered off. The title product was then dialysed and dried at 60° C.

Ink Jet Printing

To an ink base comprising 87.5 parts water, 2.5 parts SURFYNOL 465™, 5 parts 2-pyrrolidone and 5 parts thiodiglycol was added the title dye to give a 4% solution of the dye in the ink base. When applied to plain XEROX™ acid paper, using an ink jet printer, the dye gave very strong magenta prints with good light fastness and water fastness. After 48 hours exposure using an Atlas™ Xenon Weatherometer Ci35A, the print had $\Delta E=15.6$.

The wet fastness of the prints was measured using a wet fastness test in which the reflected optical density (ROD) of each of four squares of a test print is measured using a previously calibrated X-Rite™ densitometer and the correct filter for the colour under test. The average ROD for the four squares is calculated. The print is then immersed in de-ionised water (pH 5.5±1.0, temp. 22±2° C.) and stirred slowly for 5 minutes using a magnetic stirrer. The print is removed from the water, placed on absorbent paper and allowed to dry (room temperature, approx. 2 hours). When dry, the ROD for each of the four squares is again measured and the average value calculated.

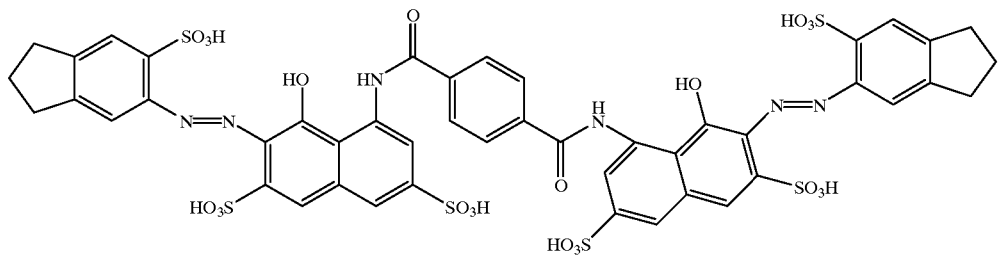

Stage (i): Preparation of Bis(1-naphthol-3,6-disulphonic acid-8-amino-)terephthaloyl coupler 8-Amino-1-naphthol-3,6-disulphonic acid (60 g) was dissolved in water (500 ml) at pH7.5 with 2N sodium carbonate. Sodium acetate (30 g) was then added as buffer. A solution of terephthaloyl chloride (33 g) in acetone (250 ml) was then added over 30 minutes at ambient temperature, and the mixture was stirred for a further 3 hours at ambient temperature. The solid formed was filtered off, slurried in acetone (500 ml) for 3 hours, filtered off again and finally dried under vacuum.

Stage (ii): Diazotisation and Coupling 5-aminoindan-6-sulphonic acid (2.13 g) was dissolved in water (75 ml) at pH7 with 2N $Na_2CO_3$, and 2N sodium nitrite solution (5.5 ml) was added. This solution was cooled in ice and added to a mixture of ice and concentrated hydrochloric acid (3 ml) and allowed to diazotise at 0–5° C. for 1 hour. Excess nitrous acid was then destroyed by the addition of a 10% sulphamic acid solution.

The coupler from stage (i) (4.28 g) was suspended in a mixture of water (300 ml) and tetrahydrofuran (100 ml), cooled in ice and the suspension of the diazonium salt above was added. The solution was adjusted to pH 6.5 with 2N The wet fastness is expressed as follows:

$$\% \text{ wet fastness} = \frac{\text{Average ROD after immersion} \times 100}{\text{Average ROD before immersion}}$$

The prints had a wet fastness of 35%.

Further inks comprising the exemplified dyes may be may be prepared as described in the following tables in which the number in the first column (headed Ex. no.) denotes the example number of dye to be used in the ink. The dye may be in its free acid form and/or in the form of any suitable salt (e.g. ammonium salt). Numbers quoted in the second column onwards refer to the number of parts of the relevant ingredient and all parts are by weight. The inks may be applied to paper by thermal or piezo ink jet printing.

The following abbreviations are used in the tables:

PG = propylene glycol;
DMK = dimethylketone;
MEOH = methanol;
CET = cetyl ammonium bromide;
BDL = butane-2,3-diol;
CHL = cyclohexanol; and DEG = diethylene glycol;
NaST = Na stearate
2P = 2-pyrollidone;
TBT = tertiary butanol;
PHO = Na$_2$HPO$_4$;
PDL = pentan-1,5-diol.

NMP = N-methyl pyrollidone;
IPA = isopropanol;
MIBK = methylisobutyl ketone;
TDG = thiodiglycol;
P12 = propane-1,2-diol.

TABLE I

| Ex. no. | Dye | Water | PG | DEG | NMP | DMK | MEOH | 2P | MIBK |
|---|---|---|---|---|---|---|---|---|---|
| 1 | 2.0 | 80 | 5 | | 6 | 4 | | 5 | |
| 2 | 10.0 | 85 | 3 | | 3 | 3 | 5 | 1 | |
| 1 | 2.1 | 91 | | 8 | | | | | 1 |
| 2 | 2.4 | 75 | 3 | 4 | | 5 | 6 | | 5 |
| 1 | 5.1 | 96 | | | | 4 | | | |
| 2 | 1.8 | 80 | | 5 | | | | 15 | |
| 1 | 2.6 | 84 | | | 11 | | | 5 | |
| 2 | 3.3 | 80 | 2 | | | 10 | 2 | | 6 |
| 1 | 5.4 | 69 | 2 | 20 | 2 | 1 | | 3 | 3 |
| 2 | 7.0 | 70 | | | 15 | | 3 | | 10 |

TABLE II

| Ex. No. | Dye | Water | PG | DEG | NMP | NaOH | Na ST | IPA | 2P | MIBK |
|---|---|---|---|---|---|---|---|---|---|---|
| 1 | 2.0 | 70 | | | 7 | | 6 | 3 | | 2 |
| 2 | 4.0 | 65 | 4 | | 6 | | 0.7 | | 5 | |
| 1 | 1.0 | 50 | | 4 | | | | 5 | | 1 |
| 2 | 3.1 | 86 | 5 | | | 2 | 0.2 | 4 | | 5 |

TABLE III

| Ex. no. | Dye | Water | PG | DEG | NMP | DMK | IPA | MEOH | 2P | MIBK |
|---|---|---|---|---|---|---|---|---|---|---|
| 1 | 3.1 | 86 | 5 | | | | 4 | | | 5 |
| 2 | 1.1 | 81 | | | 9 | | | | 9 | |
| 1 | 2.5 | 60 | 4 | 15 | 3 | 3 | 6 | 10 | 5 | 4 |
| 2 | 3.2 | 65 | | 5 | 4 | 6 | 5 | 4 | 6 | 5 |
| 1 | 10.0 | 80 | 2 | 6 | 2 | 5 | 1 | | 4 | |

TABLE IV

| Ex. no. | Dye | Water | PG | DEG | NMP | DMK | NaOH | Na ST | IPA |
|---|---|---|---|---|---|---|---|---|---|
| 1 | 3.0 | 90 | | 5 | 5 | | | 0.2 | |
| 2 | 5 | 65 | 5 | 20 | | | | | 10 |
| 1 | 4.1 | 80 | | 5 | 2 | 10 | | 0.3 | |
| 2 | 10.8 | 90 | 5 | | | | | | 5 |
| 1 | 12.0 | 90 | | | | 7 | | 0.3 | 3 |

TABLE V

| Ex. no. | Dye | Water | PG | DEG | NMP | CET | PHO | 2P | P12 |
|---|---|---|---|---|---|---|---|---|---|
| 1 | 3.0 | 80 | 15 | | | 0.2 | | 5 | |
| 2 | 9.0 | 90 | | 5 | | | 1.2 | | 5 |
| 1 | 2.5 | 90 | | | 6 | 4 | 0.12 | | |
| 2 | 3.1 | 82 | 4 | 8 | | | 0.3 | | 6 |
| 1 | 10.0 | 91 | | | 6 | | | 3 | |
| 2 | 5.0 | 78 | 5 | 11 | | | | 6 | |

TABLE V-continued

| Ex. no. | Dye | Water | PG | DEG | NMP | CET | PHO | 2P | P12 |
|---|---|---|---|---|---|---|---|---|---|
| 1 | 6.0 | 63 | 3 | | 4 | | 2.0 | | |
| 2 | 3.0 | 72 | | 15 | | | 0.8 | | 3 |
| 1 | 5.4 | 86 | 5 | | 7 | | 3.0 | 7 | |
| 2 | 2.0 | 90 | | 10 | | | | | 10 |

TABLE VI

| Ex. no. | Dye | Water | PG | DEG | NMP | CET | TBT | TDG |
|---|---|---|---|---|---|---|---|---|
| 1 | 1.5 | 85 | 5 | 5 | | 0.15 | 5.0 | 0.2 |
| 2 | 9.0 | 90 | | 5 | 5 | | | 0.3 |
| 1 | 2.0 | 90 | | 10 | | | | |
| 2 | 2.0 | 88 | | | | | | 10 |
| 1 | 5.5 | 70 | 4 | | 4 | 0.4 | 3 | |

TABLE VII

| Ex. no. | Dye | Water | PG | DEG | NMP | TBT | TDG | BDL | PHO | 2P |
|---|---|---|---|---|---|---|---|---|---|---|
| 1 | 0.9 | 85 | | 10 | | | | 5 | 0.2 | |
| 2 | 4.0 | 70 | | 10 | 4 | | | 1 | | 4 |
| 1 | 2.2 | 75 | 4 | 10 | 3 | | | 2 | | 6 |
| 2 | 9.0 | 76 | | 9 | 7 | 3.0 | | | 0.95 | 5 |
| 1 | 2.1 | 70 | 5 | 5 | 5 | 0.2 | 0.1 | 5 | 0.1 | 5 |

TABLE VIII

| Ex. no. | Dye | Water | PG | DEG | NMP | TBT | TDG | 2P |
|---|---|---|---|---|---|---|---|---|
| 1 | 3.0 | 55 | | | 5 | 2.0 | | 3 |
| 2 | 6.0 | 65 | | 4 | | 0.1 | 5 | |
| 1 | 5.0 | 78 | | | 5 | | 12 | 5 |
| 2 | 8.0 | 70 | 2 | | 8 | | 15 | 5 |
| 1 | 10.0 | 80 | | | | | 8 | 12 |

TABLE IX

| Ex. no. | Dye | Water | PG | DEG | NMP | BDL | PHO | 2P | P12 |
|---|---|---|---|---|---|---|---|---|---|
| 1 | 10.0 | 75 | 3 | | 5 | 3 | | 3 | 1 |
| 2 | 3.5 | 80 | | 6 | | | | | 5 |
| 1 | 2.0 | 90 | 7 | | | 7 | 0.5 | | |
| 2 | 6.0 | 65 | | | 5 | | | 2 | |
| 1 | 4.0 | 70 | | 10 | 4 | 1 | | 4 | 11 |

TABLE X

| Ex. no. | Dye | Water | PG | DEG | NMP | CET | TBT | TDG | BDL | PHO | 2P |
|---|---|---|---|---|---|---|---|---|---|---|---|
| 1 | 1.5 | 80 | 1 | 2 | 3 | 0.5 | 0.4 | | 7 | 2 | 10 |
| 2 | 3.0 | 60 | | 4 | | 2.0 | | 0.5 | | | |
| 1 | 4.5 | 90 | | 3 | 6 | | 7.0 | | 1 | 3 | 2 |
| 2 | 3.0 | 95 | | 7 | | 4 | | 3 | | 0.5 | |
| 1 | 2.1 | 70 | 5 | 5 | 5 | 0.1 | 0.2 | 0.1 | 5 | 0.1 | 5 |

TABLE XI

| Ex. no. | Dye | Water | PG | DEG | NMP | CHL | PHO | 2P | PDL |
|---|---|---|---|---|---|---|---|---|---|
| 1 | 7.0 | 75 | 3 | | 5 | 3 | | 3 | 1 |
| 2 | 3.5 | 60 | | | 2 | | | | 5 |
| 1 | 2.0 | 90 | 7 | | | 7 | 1.5 | | 2 |
| 2 | 6.0 | 65 | | | 5 | | | 2 | |
| 1 | 4.0 | 70 | | 5 | 4 | 1 | | 4 | 12 |

What is claimed is:

1. A compound of Formula (1)

$$T_q\text{—}W \quad \text{Formula (1)}$$

or a mixture thereof or a stereoisomer, zwitterion, polymorph, solvate, isotopic form, or suitable salt thereof in which:

q represents from 1 to 4 inclusive;

W comprises and optionally substituted hydrocarbyl group; and each T independently comprises a group of the Formula (2)

$$B\text{—}N\text{=}N\text{—}J\text{—}Y \quad \text{Formula (2)}$$

in which:

B comprises an optionally substituted indanyl group;

Y comprises a carbonyl group or a sulphonyl group; and

J comprises a group of Formula (3):

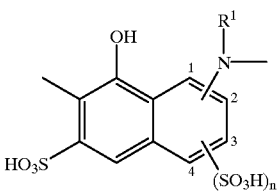

Formula (3)

in which:

$R^1$ comprises H or optionally substituted hydrocarbyl; and n represents from 0 to 3 inclusive; the compounds of Formula (1) being substantially free from fiber reactive groups.

2. A compound according to claim 1, in which W comprises an optionally substituted aromatic group, or an optionally substituted aliphatic group.

3. A compound according to claim 1, in which $R^1$ comprises H or optionally substituted alkyl.

4. A compound according to claim 1, in which W is an optionally substituted aromatic group with a valency of q, where q is as previously defined, selected from:

Ar; two groups of the formula Ar joined together directly or through a divalent linking group; and an optionally substituted group of the formula alkyleneAr, where Ar is an optionally substituted monocylic or polycyclic aromatic group containing up to 10 carbon atoms, and Ar optionally comprises one or more heteroatoms.

5. A compound according to claim 1, in which W is an optionally substituted aliphatic group with a valency of q, where q is as previously defined, and W comprises up to 12 carbon atoms and is straight chained, branched chained or cyclic.

6. A compound according to claim 1, where q is 1 or 2.

7. A compound according to claim 1, represented by Formula (5) and/or suitable salts and other forms thereof, where Formula (5) represents:

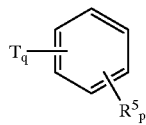

Formula (5)

in which q and each T are as previously defined;

p represents 0, 1, 2 or 3 provided that (p+q)≦6; and each $R^5$ is independently $C_{1-10}$alkyl, $C_{2-10}$alkenyl, $C_{5-8}$cycloalkyl, $C_{1-6}$alkoxy, aryl, a 5 or 6 membered heterocyclic group each of the preceding groups being optionally substituted by one or more halo; $NO_2$; $CF_3$; CN; $SO_3H$; or groups of formulae $OR^3$, $SR^3$, $COR^3$, $COOR^3$, $NR^3R^4$, $NR^3COR^4$, $CONR^3R^4$, $SO_2NR^3R^4$, or $OCOR^3$, where:

$R^3$ and $R^4$ each independently represent H, optionally substituted alkyl, optionally substituted cycloalkyl, optionally substituted alkenyl, optionally substituted aryl, optionally substituted aralkyl a heterocyclic group or $R^3$ and $R^4$ together with the nitrogen to which they are attached form a 5 or 6 membered ring.

8. A compound according to claim 7, where q is 1, p is 0, 1 or 2; and each $R^1$ is independently halo, COOH; $SO_3H$; OH; $C_{1-6}$alkyl optionally substituted by OH or COOH; or $C_{1-4}$alkoxy optionally substituted by OH or halo.

9. A compound according to claim 1, the compound represented by any of Formulae (5a), (5b), (5c) or suitable salts thereof

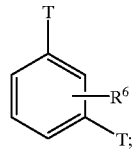

Formula (5a)

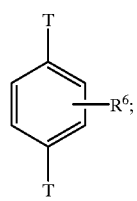

Formula (5b)

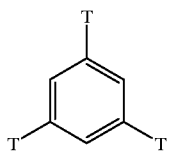

Formula (5c)

where each T independently is as previously defined; and $R^6$ is H, COOH, OH, $C_{1-4}$alkyl or $C_{1-4}$alkoxy.

10. A compound of according to claim 9, where $R^1$ is H.

11. A compound according to claim 1, where B is of the Formula (6):

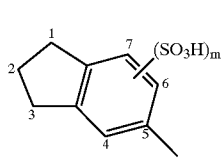

Formula (6)

where m represents from 0 to 3 inclusive.

12. A compound according to claim 11 in which m is 1 and the sulpho group is attached at the 6 position in the indanyl group.

13. A compound according to claim 1, where J represents a moiety of Formula (7)

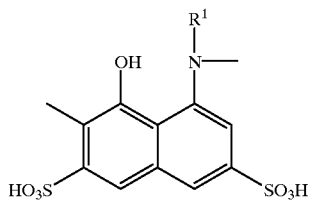

Formula (7)

where $R^1$ is as previously defined.

14. A colourant for an ink, characterised in that the colourant is a compound according to claim 1.

15. An ink comprising a compound according to claim 1 and a liquid medium.

16. An ink according to claim 15 wherein the liquid medium comprises water and one or more organic solvents in a weight ratio of from 99:1 to 1:99.

17. A process for printing a substrate with an ink using an ink jet printer, which comprises applying to the substrate an ink that contains a compound according to claim 1.

18. A paper, an overhead projector slide, a textile material or a metal, glass or ceramic substrate printed with an ink which comprises a compound according to claim 1.

* * * * *